United States Patent
Paliwal et al.

(10) Patent No.: US 12,039,641 B2
(45) Date of Patent: Jul. 16, 2024

(54) SYMBOL RECOGNITION FROM RASTER IMAGES OF PANDIDs USING A SINGLE INSTANCE PER SYMBOL CLASS

(71) Applicant: Tata Consultancy Services Limited, Mumbai (IN)

(72) Inventors: Shubham Singh Paliwal, Noida (IN); Lovekesh Vig, Noida (IN); Monika Sharma, Noida (IN)

(73) Assignee: Tata Consultancy Limited Services, Mumbai (IN)

( * ) Notice: Subject to any disclaimer, the term of this patent is extended or adjusted under 35 U.S.C. 154(b) by 172 days.

(21) Appl. No.: 17/722,527

(22) Filed: Apr. 18, 2022

(65) Prior Publication Data
US 2023/0045646 A1 Feb. 9, 2023

(30) Foreign Application Priority Data
Jun. 25, 2021 (IN) .............................. 202121028689

(51) Int. Cl.
| | |
|---|---|
| *G06T 11/20* | (2006.01) |
| *G06N 3/04* | (2023.01) |
| *G06T 3/147* | (2024.01) |
| *G06T 11/40* | (2006.01) |

(52) U.S. Cl.
CPC .............. *G06T 11/203* (2013.01); *G06N 3/04* (2013.01); *G06T 3/147* (2024.01); *G06T 11/40* (2013.01)

(58) Field of Classification Search
None
See application file for complete search history.

(56) References Cited

U.S. PATENT DOCUMENTS

| | | | |
|---|---|---|---|
| 2016/0078649 A1* | 3/2016 | Bonacina | G06V 30/32 345/442 |
| 2022/0301173 A1* | 9/2022 | Cheng | G06T 7/11 |

OTHER PUBLICATIONS

Moreno-García, Carlos Francisco, Eyad Elyan, and Chrisina Jayne. "New trends on digitisation of complex engineering drawings." Neural computing and applications 31 (2019): 1695-1712. (Year: 2019).*

(Continued)

*Primary Examiner* — Nurun Flora
(74) *Attorney, Agent, or Firm* — Finnegan, Henderson, Farabow, Garrett & Dunner, L.L.P.

(57) ABSTRACT

Traditional systems that enable extracting information from Piping and Instrumentation Diagrams (P&IDs) lack accuracy due to existing noise in the images or require a significant volume of annotated symbols for training if deep learning models that provide good accuracy are utilized. Conventional few-shot/one-shot learning approaches require a significant number of training tasks for meta-training prior. The present disclosure provides a method and system that utilizes the one-shot learning approach that enables symbol recognition using a single instance per symbol class which is represented as a graph with points (pixels) sampled along the boundaries of different symbols present in the P&ID and subsequently, utilizes a Graph Convolutional Neural Network (GCNN) or a GCNN appended to a Convolutional Neural Network (CNN) for symbol classification. Accordingly, given a clean symbol image for each symbol class, all instances of the symbol class may be recognized from noisy and crowded P&IDs.

19 Claims, 8 Drawing Sheets

(56) References Cited

OTHER PUBLICATIONS

Chen et al., "Image Segmentation Through Efficient Boundary Sampling," (2009).
Kang et al., "A Digitization and Conversion Tool for Imaged Drawings to Intelligent Piping and Instrumentation Diagrams (P&ID)," Energies, 12:2593 (2019).
Li et al., "Multi-Label Remote Sensing Image Scene Classification by Combining a Convolutional Neural Network and a Graph Neural Network," Remote Sens., 12:4003 (2020).
Nikolentzos et al., "Image Classification using Graph-based Representations and Graph Neural Networks," (2011).

* cited by examiner

SYMBOL RECOGNITION FROM RASTER IMAGES OF PANDIDs USING A SINGLE INSTANCE PER SYMBOL CLASS

PRIORITY CLAIM

This U.S. patent application claims priority under 35 U.S.C. § 119 to: Indian Patent Application No. 202121028689, filed on 25th Jun. 2021. The entire contents of the aforementioned application are incorporated herein by reference.

TECHNICAL FIELD

The disclosure herein generally relates to symbol recognition from raster images of Piping and Instrumentation Diagrams (P&IDs), and, more particularly, to methods and systems for performing symbol recognition using a single instance per symbol class.

BACKGROUND

Piping and Instrumentation Diagrams (P&IDs) are a standardized format for depicting schematics about material flow, equipment components, and control devices in oil and gas, chemical manufacturing and underground utility companies. A P&ID is based on process flow diagrams which illustrate the piping schematics with instruments using line and graphical symbols, along with appropriate annotations. Presently, millions of such legacy P&IDs are stored in an unstructured image format and the data trapped in these documents is required for inventory management, detailed design, procurement, and construction of a plant. Manually extracting information from such P&IDs is a very tedious, time-consuming and error-prone process as it requires users to interpret the meaning of different components such as pipelines, inlets, outlets and graphic symbols based on the annotations and geometric/topological relationships of visual elements.

SUMMARY

Embodiments of the present disclosure present technological improvements as solutions to one or more of the above-mentioned technical problems recognized by the inventors in conventional systems.

In an aspect, there is provided a processor implemented method comprising the steps of: receiving as an input, via one or more hardware processors, at least a portion of a Piping and Instrumentation Diagram (P&ID) as a raster graphics (RG) image; converting, via the one or more hardware processors, the raster graphics (RG) image to a vector graphics (VG) image, wherein contours of a plurality of entities comprised in the VG image are represented by sequential Bezier curves, and wherein the plurality of entities includes texts, symbols and pipelines; and segmenting, via one or more hardware processors, the symbols from the VG image, wherein the sequential Bezier curves along the contours of the plurality of entities represent one or more paths comprising one or more loops such that ends thereof are connected, wherein the step of segmenting the symbols comprises: sampling a set of points sequentially along the one or more paths at predetermined fixed distance intervals, each point in the sampled set of points being characterized by a slope; eliminating the one or more paths corresponding to the texts based on (i) a length associated with the one or more paths computed using the sampled set of points and (ii) a computed segregation threshold; and eliminating the one or more paths corresponding to the pipelines using a sliding window method.

In another aspect, there is provided a system comprising: memory storing instructions; one or more communication interfaces; one or more hardware processors coupled to the memory via the one or more communication interfaces, wherein the one or more hardware processors are configured by the instructions to: receive as an input, at least a portion of a Piping and Instrumentation Diagram (P&ID) as a raster graphics (RG) image; convert the raster graphics (RG) image to a vector graphics (VG) image, wherein contours of a plurality of entities comprised in the VG image are represented by sequential Bezier curves, and wherein the plurality of entities includes texts, symbols and pipelines; and segment the symbols from the VG image, wherein the sequential Bezier curves along the contours of the plurality of entities represent one or more paths comprising one or more loops such that ends thereof are connected, wherein the symbols are segmented by: sampling a set of points sequentially along the one or more paths at predetermined fixed distance intervals, each point in the sampled set of points being characterized by a slope; eliminating the one or more paths corresponding to the texts based on (i) a length associated with the one or more paths computed using the sampled set of points and (ii) a computed segregation threshold; and eliminating the one or more paths corresponding to the pipelines using a sliding window method.

In yet another aspect, there is provided a computer program product comprising a non-transitory computer readable medium having a computer readable program embodied therein, wherein the computer readable program, when executed on a computing device, causes the computing device to: receive as an input, at least a portion of a Piping and Instrumentation Diagram (P&ID) as a raster graphics (RG) image; convert the raster graphics (RG) image to a vector graphics (VG) image, wherein contours of a plurality of entities comprised in the VG image are represented by sequential Bezier curves, and wherein the plurality of entities includes texts, symbols and pipelines; and segment the symbols from the VG image, wherein the sequential Bezier curves along the contours of the plurality of entities represent one or more paths comprising one or more loops such that ends thereof are connected, wherein the symbols are segmented by: sampling a set of points sequentially along the one or more paths at predetermined fixed distance intervals, each point in the sampled set of points being characterized by a slope; eliminating the one or more paths corresponding to the texts based on (i) a length associated with the one or more paths computed using the sampled set of points and (ii) a computed segregation threshold; and eliminating the one or more paths corresponding to the pipelines using a sliding window method.

In accordance with an embodiment of the present disclosure, the one or more hardware processors are configured to preprocess the VG image for at least one of rotation and scaling variations prior to sampling the set of points.

In accordance with an embodiment of the present disclosure, the one or more hardware processors are configured to compute the segregation threshold as a knee point of a curve representing the number of sampled points in each of the one or more paths (Y-axis) versus a cardinal value of the one or more paths (X-axis).

In accordance with an embodiment of the present disclosure, the one or more hardware processors are configured to eliminate the one or more paths corresponding to the texts by: computing the length associated with the one or more paths for each entity from the plurality of entities based on the number of sampled points in each of the one or more paths, the number of sampled points being proportional to the length of a corresponding path; and identifying the one or more paths having a computed length lesser than the computed length associated with the knee point as the one or more paths corresponding to the texts for elimination.

In accordance with an embodiment of the present disclosure, the one or more hardware processors are configured to eliminate pipelines using a sliding window method comprises: querying each point $p_i$ from the sampled set of points, for the presence of other points in a sliding window, wherein the sliding window is of length l and height t in an orthogonal direction to the slope of the point p; and classifying the queried point $p_i$ as a component of the pipelines for elimination, if a standard deviation of points in the sliding window is within a predetermined threshold.

In accordance with an embodiment of the present disclosure, the one or more hardware processors are configured to determine the height t by traversing the one or more paths and finding a maximum distance from the sampled set of points along the orthogonal direction to the queried point.

In accordance with an embodiment of the present disclosure, the slope of the point $p_i$ with reference to two neighboring points $p_{i-1}$ and $p_{i+1}$ is represented as:

$$slope_i = Avg(a\ tan\ 2(p_{i-1},p), a\ tan\ 2(p,p_{i+1}), a\ tan\ 2(p_{i-1},p_{i+1}));$$

and the height t is represented as: $t = MAX(\in, \beta\ MAX(\forall\ p_{iN}\ dist(p_i, p_{iN})))$, wherein $p_{iN}$ are points along the paths orthogonal to a query point $p_i$.

In accordance with an embodiment of the present disclosure, the one or more hardware processors are configured to classify the segmented symbols using (i) a pre-trained Graph Convolutional Neural Network (GCNN), wherein the segmented symbols are represented by an associated point cloud comprising the sampled set of points or (ii) the pre-trained GCNN appended to a Convolutional Neural Network (CNN).

In accordance with an embodiment of the present disclosure, the one or more hardware processors are configured to train a GCNN, prior to classifying the segmented symbols, by: receiving a set of symbol classes comprising a b in the form of the VG image; augmenting the single instance per symbol class by applying affine transformation to each sub-part of the received VG image with rotation ranging from an angle −20° to 20°, scaling parameter ranging from 0.9 to 1.1 and shear parameter ranging from −0.05 to 0.05 to obtain an augmented set of instances for each symbol class; obtaining a plurality of features for each point in the (i) received VG image and the (ii) augmented set of instances for each symbol class; and training the GCNN, by inputting a graph generated for every instance of a symbol class, using each point in the (i) received VG image and the (ii) augmented set of instances for each symbol class, each point having the obtained plurality of features, to obtain the pre-trained GCNN.

In accordance with an embodiment of the present disclosure, the plurality of features includes: (i) two features corresponding to a coordinate information associated with each point and (ii) seven features corresponding to seven Hu moments for each point.

In accordance with an embodiment of the present disclosure, the one or more hardware processors are configured to train the CNN, prior to classifying the segmented symbols, using an image created from each point in the (i) received VG image and the (ii) augmented set of instances for each symbol class for obtaining a global embedding of the point cloud thereof.

In accordance with an embodiment of the present disclosure, the pre-trained GCNN is a Dynamic Graph CNN (DGCNN) and the CNN is a Residual neural network (ResNet).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
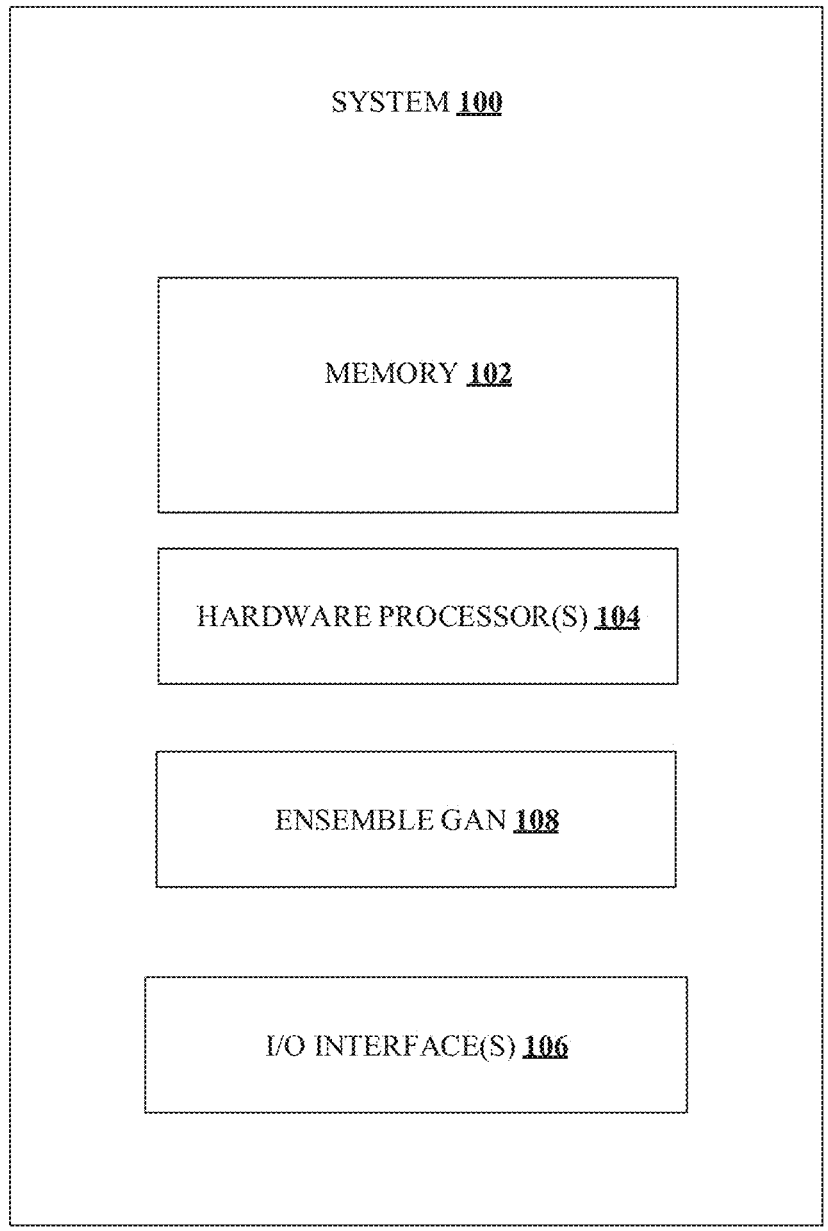
FIG. 1 illustrates an exemplary block diagram of a system for symbol recognition from raster images of Piping and Instrumentation Diagrams (P&IDs), using a single instance per symbol class, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Piping and Instrumentation Diagrams (P&IDs) are ubiquitous in several manufacturing, oil and gas enterprises for representing engineering schematics and equipment layout. Major components of the P&IDs include symbols with field specific meanings, pipelines representing connections between symbols, and textual attributes. Manually extracting information from such P&IDs is a very tedious, time-consuming and error-prone process as it requires users to interpret meanings of different components such as pipelines, inlets, outlets and graphic symbols based on annotations, and geometric/topological relationships of visual elements.

There is a limited body of work on digitization of engineering drawing documents in the literature. Early attempts used traditional image recognition techniques utilizing geometrical features of objects such as edge detection, Hough transform and morphological operations. In such approaches, the system tries to learn and store the graphical representation of the symbol presented by the user and later uses the acquired knowledge about the symbol for recognition. These systems based on standard vision techniques were not powerful enough to address the challenges arising due to noisy images, variations in text fonts, resolutions and minute visual differences among various symbols. Recently deep learning techniques have yielded significant improvements in accuracy for information extraction from P&IDs. A combination of traditional vision techniques and state-of-the art deep learning model [such as Fully Convolutional Network (FCN)] based segmentation for detection of symbols have been utilized to address low inter-class variability and noisy textual elements present inside symbols. However, this requires a significant volume of annotated symbols for training the model and fails for rarely occurring symbols for which training data is sparse.

Recent work in few-shot/one-shot learning broadly adopt two approaches: 1) metric learning which involves learning an embedding space to separate different classes and 2) a meta-training phase which involves training a meta learner on a collection of tasks from the same task distribution to discover a task-independent network initialization. However, such techniques require a significant number of training tasks for meta-training prior to being employed for one-shot recognition.

To address the challenges in conventional approaches and to avoid the meta-training required in the conventional few-shot/one-shot techniques, the present disclosure provides a method and system that utilizes (i) the one-shot learning approach that enables symbol recognition using a single instance per symbol class which is represented as a graph with points (pixels) sampled along the boundaries of different entities present in the P&ID and subsequently, (ii) a Convolutional Neural Network (CNN) for symbol classification. Accordingly, given a clean symbol image for each symbol class, all instances of the symbol class may be recognized from noisy and crowded P&IDs.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1 illustrates an exemplary block diagram of a system 100 for symbol recognition from raster images of Piping and Instrumentation Diagrams (P&IDs), using a single instance per symbol class, in accordance with some embodiments of the present disclosure. In an embodiment, the system 100 includes one or more hardware processors 104, communication interface(s) or input/output (I/O) interface(s) 106, and one or more data storage devices or memory 102 operatively coupled to the one or more hardware processors 104. The one or more hardware processors 104 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The communication interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
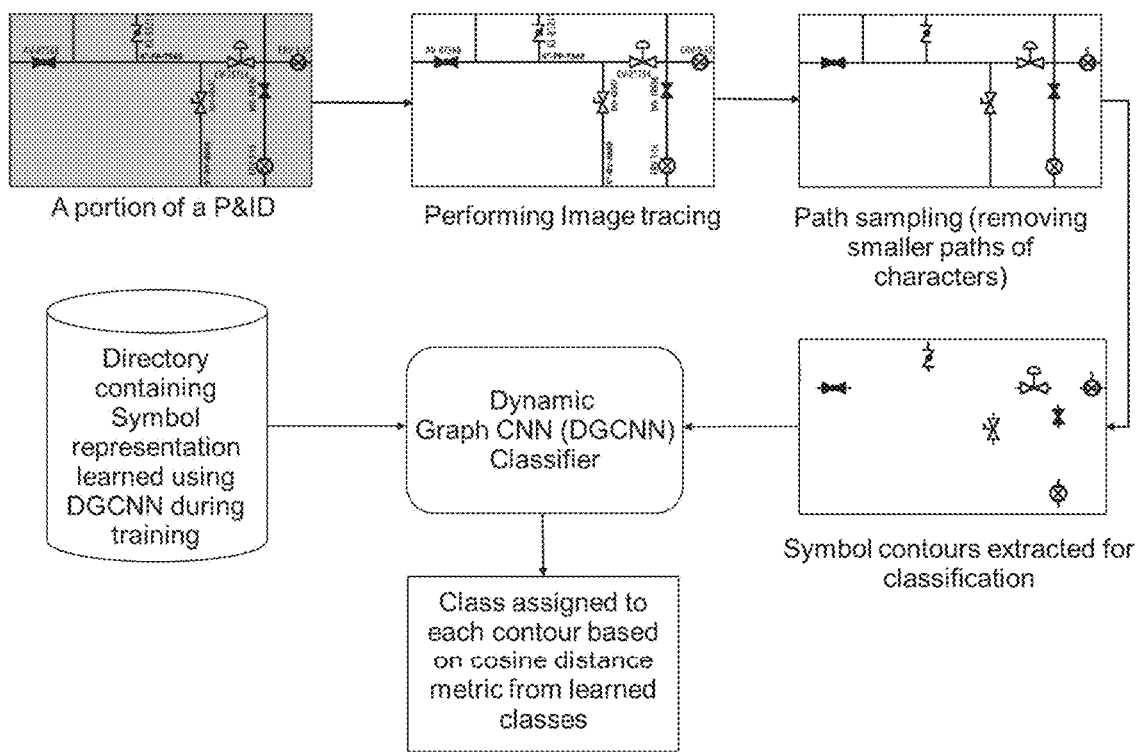
FIG. 2 is a functional block diagram of the system of FIG. 1 in accordance with some embodiments of the present disclosure.

FIG. 2 is a functional block diagram of the system of FIG. 1 in accordance with some embodiments of the present disclosure. As illustrated in FIG. 2, in an embodiment, a raster graphics (RG) image of at least a portion of a Piping and Instrumentation Diagram (P&ID) is received and followed by image tracing using say, a Potrace method. Path sampling is then performed that involves sampling, points along the periphery of a plurality of entities comprised in the received RG image. Typically, the plurality of entities in a P&ID includes texts, symbols and pipelines. The entities are segmented to obtain contours (point cloud) corresponding to symbols. The one-shot learning approach is then utilized that enables symbol recognition using a single instance per symbol class which is represented as a graph with points (pixels) sampled along the contours of different symbols present in the P&ID and subsequently. A Graph Convolutional Neural Network (GCNN) such as a Dynamic Graph CNN or a GCNN appended to a Convolutional Neural Network (CNN) such as a Residual neural network (ResNet) for symbol classification. Accordingly, given a clean symbol image for each symbol class, all instances of the symbol class may be recognized from noisy and crowded P&IDs.

Figure 3A:
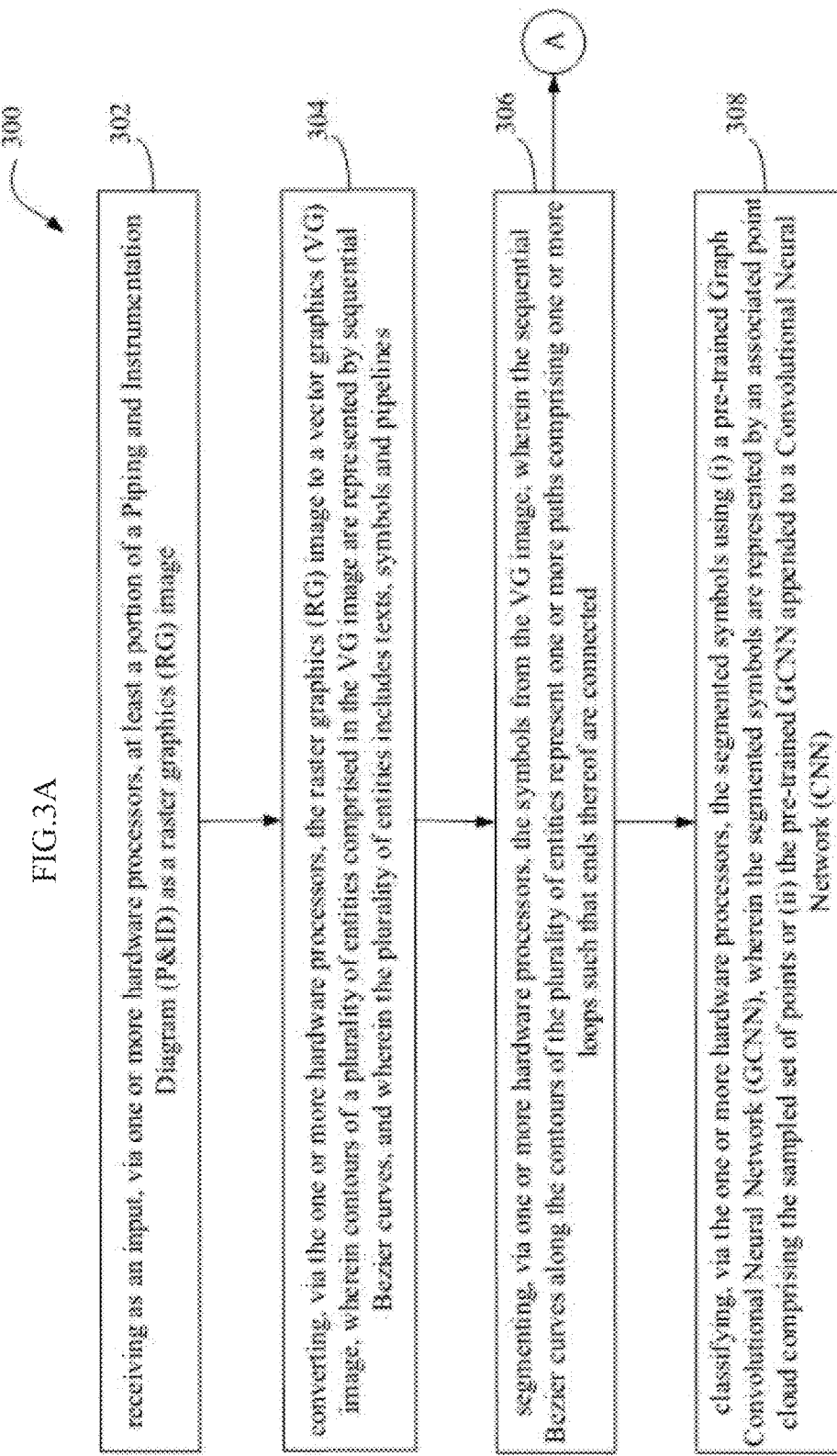
FIG. 3A through FIG. 3B illustrates an exemplary flow diagram of a computer implemented method for symbol recognition from raster images of Piping and Instrumentation Diagrams (P&IDs), using a single instance per symbol class, in accordance with some embodiments of the present disclosure.
Figure 3B:
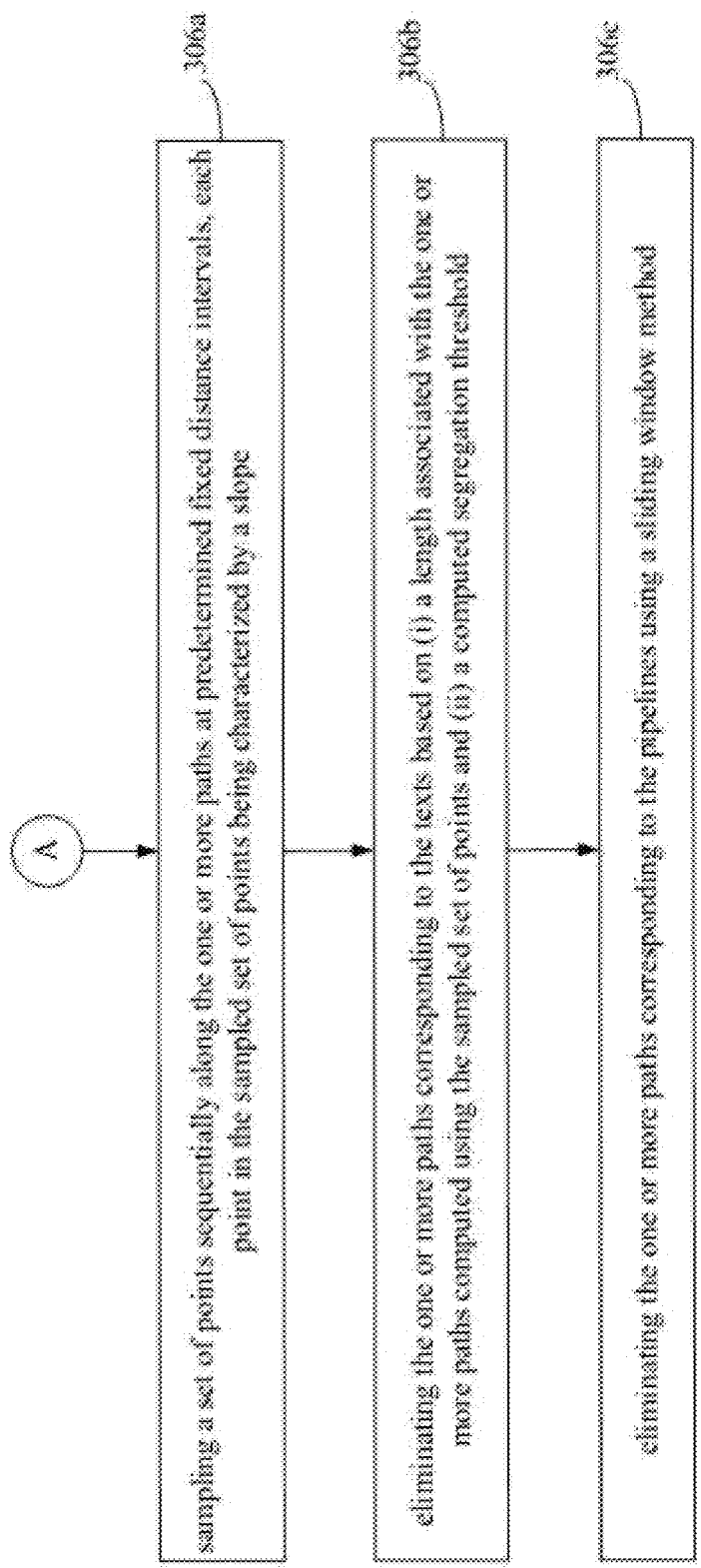

FIG. 3A through FIG. 3B illustrates an exemplary flow diagram of a computer implemented method 300 for symbol recognition from raster images of Piping and Instrumentation Diagrams (P&IDs), using a single instance per symbol class, in accordance with some embodiments of the present disclosure. In an embodiment, the system 100 includes the memory 102 operatively coupled to the one or more hardware processors 104 and is configured to store instructions configured for execution of steps of the method 300 by the one or more hardware processors 104. The steps of the method 300 will now be explained in detail with reference to the components of the system 100 of FIG. 1 in line with the functional block diagram of FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In the context of the present disclosure, the expression 'P&ID' refers to a raster graphics (RG) image of a 'P&ID sheet' and may be used interchangeably. The entity 'texts' refer to equipment information, pipeline codes, symbol codes, and the like, the entity 'symbols' refer to equipment, instruments, and the like, while the entity 'pipelines' in the P&ID refer to interconnecting pipelines in the P&ID.

In an embodiment of the present disclosure, the one or more hardware processors 104, are configured to receive as an input, at step 302, at least a portion of a Piping and Instrumentation Diagram (P&ID) as a raster graphics (RG) image. Typically, an entire P&ID is processed, however, there are instances when there may be independent areas covered in a P&ID sheet and symbol recognition may be required for a single area constituting a portion of a P&ID sheet.

In an embodiment of the present disclosure, the one or more hardware processors 104, are configured to convert, at step 304, the raster graphics (RG) image to a vector graphics (VG) image, wherein contours of a plurality of entities comprised in the VG image are represented by sequential Bezier curves, characterized by associated equations. In an embodiment, the step of converting the RG image to the VG image is also referred to as image tracing and may be performed using a method such as Potrace technique.

The black and white pixels in a binarized image give rise to several contours with dark regions forming separate contours. In image tracing, the RG image is processed to produce a vector outline of the contours by approximating them via a set of algebraic equations (Bezier curves). Spline curves generalize the contours by creating smoother outlines. In an embodiment, adaptive thresholding is utilized on the input image with a window size of 13×13 to efficiently segregate foreground (black pixels) and background (white pixels) regions.

In an embodiment of the present disclosure, the one or more hardware processors 104, are configured to segment, at step 306, the symbols from the VG image, wherein the sequential Bezier curves along the contours of the plurality of entities represent one or more paths comprising one or more loops such that ends of the loops are connected. Typically, there are two paths for an entity. For instance, in the alphabet 'O', there are two separate sequential loops on the outline indicating the interior and exterior outline.

To localize the symbols, the other entities, viz., the texts and the pipelines are required to be eliminated. In an embodiment, the step 306, of segmenting the symbols is based on a path sampling method, wherein, at step 306a, a set of points (pixels) are sequentially sampled along the one or more paths at predetermined fixed distance intervals, each point in the sampled set of points being characterized by a slope. The predetermined fixed distance is determined empirically and is typically about 2 to 3 pixels. After the path sampling is done, the one or more paths corresponding to the texts are eliminated at step 306a and the one or more paths corresponding to the pipelines are eliminated at step 306b.

The sampled set of points along each path formed on the outline of the same contour have strong correlations with reference to slope and distance. The regions where the slope and distance vary, are marked as junctions that represent points from where a new branch of points emerges, or two or more branches of points merge together.

In an embodiment, the step 304a of sampling the set of points is preceded by preprocessing the VG image for at least one of rotation and scaling variation. Typically, the preprocessing involves affine transformations. In an embodiment, the images are resized to a fixed width of 4000 pixels while maintaining the aspect ratio.

Figure 4:
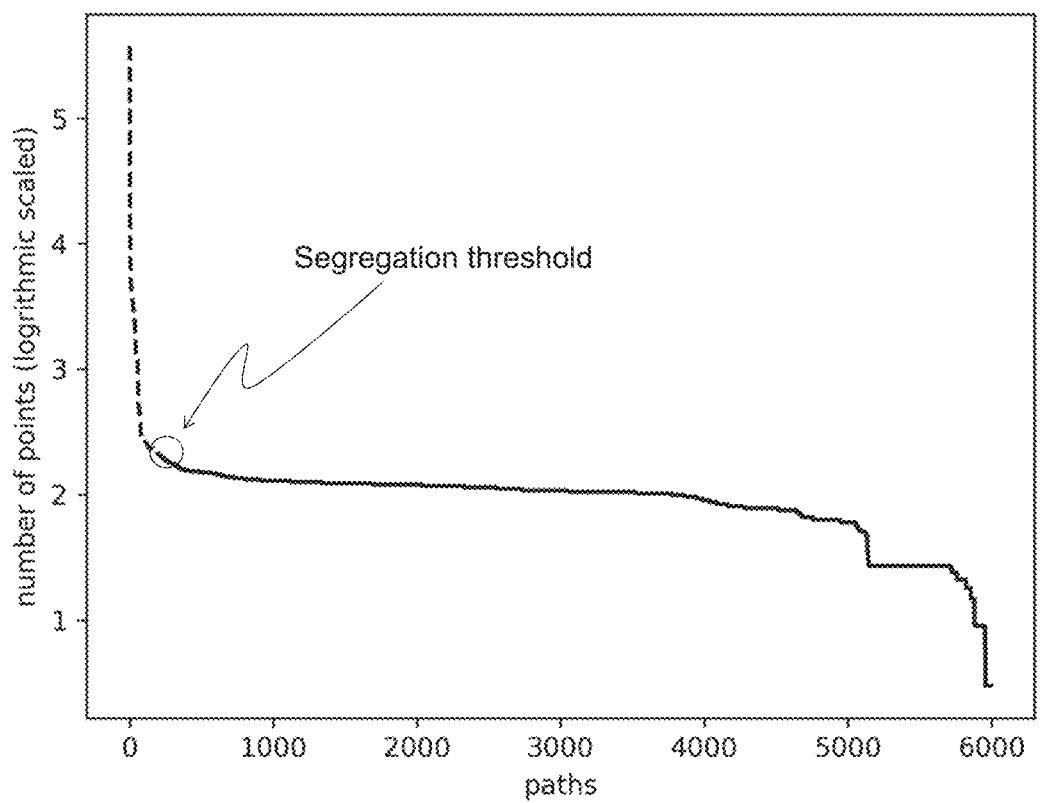
FIG. 4 is a graphical illustration of a segregation threshold for eliminating one or more paths corresponding to texts comprised in the P&IDs, in accordance with some embodiments of the present disclosure.

In an embodiment, the one or more paths corresponding to the texts are eliminated, at step 306b, based on (i) a length associated with the one or more paths computed using the sampled set of points and (ii) a computed segregation threshold. In an embodiment, the computed segregation threshold is a knee point of a curve representing the number of sampled points in each of the one or more paths (Y-axis) versus a cardinal value of the one or more paths (X-axis). FIG. 4 is a graphical illustration of the segregation threshold for eliminating the one or more paths corresponding to texts comprised in the P&IDs, in accordance with some embodiments of the present disclosure. In FIG. 4, the continuous line part of the curve corresponds to the texts to be eliminated. The length associated with the one or more paths for each entity from the plurality of entities is computed based on the number of sampled points in each of the one or more paths, the number of sampled points being proportional to the length of a corresponding path. The one or more paths having a computed length lesser than the computed length associated with the knee point (Y-coordinate) is identified as the one or more paths corresponding to the texts for elimination.

In an embodiment, the one or more paths corresponding to the pipelines are eliminated, at step 306c, using a sliding window method. Each point $p_i$ from the sampled set of points is queried for the presence of other points in a sliding window, wherein the sliding window is of length l and height t in an orthogonal direction to the slope of the point. The slope of each queried point $p_i$ is computed by using the average of two neighbors $p_{i-1}$ and $p_{i+1}$ and is represented by $$\text{slope}_i = \text{Avg}(a \tan 2(p_{i-1}, p_i), a \tan 2(p_i, p_{i+1}), a \tan 2(p_{i-1}, p_{i+1}))$$

→ (1)

In an embodiment, the height t is determined by traversing the one or more paths and finding a maximum distance from the sampled set of points along the orthogonal direction to the queried point $p_i$ and is represented by $$t = \text{MAX}(\in, \beta \text{MAX}(\forall p_{iN} \text{dist}(p_i, p_{iN})))$$

→ (2)

where $p_{iN}$ are points along the paths orthogonal to a query point $p_i$.

A queried point $p_i$ is classified as a component of the pipelines for elimination, if a standard deviation of points in the sliding window is within a predetermined threshold, that is empirically determined. Alternatively, the queried point $p_i$ maybe a component of the entity symbols.

Figure 5A:
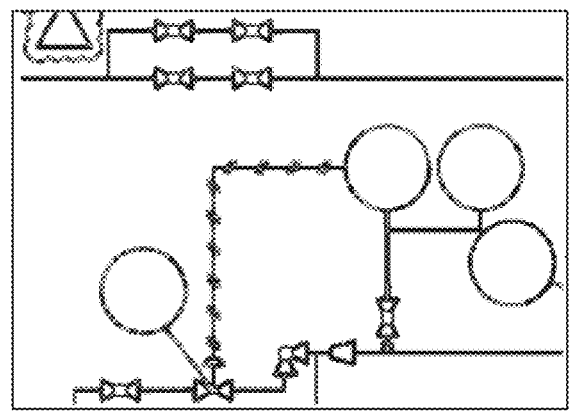
FIG. 5A and FIG. 5B illustrate an exemplary portion from a raster image of a P&ID and sampled points along the contours of entities comprised in the exemplary portion respectively, in accordance with some embodiments of the present disclosure.
Figure 5B:
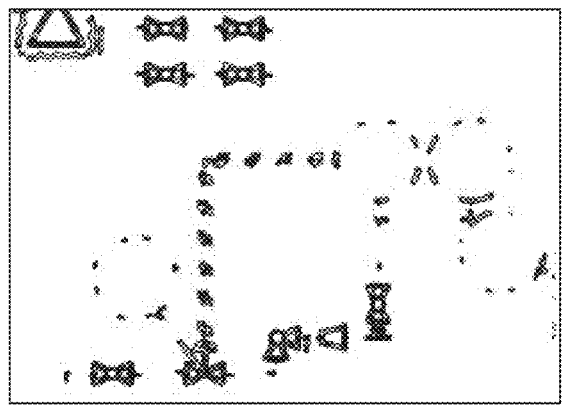

FIG. 5A and FIG. 5B illustrate an exemplary portion from a raster image of a P&ID and sampled points along the contours of entities comprised in the exemplary portion respectively, in accordance with some embodiments of the present disclosure. In accordance with the present disclosure, the entities of a P&ID are usually connected. In case of small discontinuities in straight lines (pipelines), the regions of discontinuity are marked as potential symbol regions. Even if the line terminates (at a symbol like a flange), and the slope changes by a significant amount, the terminal region of the line is marked as a potential symbol.

The segmented symbols obtained after step 306 explained above, are further classified. Accordingly, in an embodiment of the present disclosure, the one or more hardware processors 104, are configured to classify, at step 308, the segmented symbols using (i) a pre-trained Graph Convolutional Neural Network (GCNN), wherein the segmented symbols are represented by an associated point cloud comprising the sampled set of points or (ii) the pre-trained GCNN appended to a Convolutional Neural Network (CNN). In an embodiment, the pre-trained GCNN is a Dynamic Graph CNN (DGCNN) and the CNN is a Residual neural network (ResNet). In an embodiment, the ResNet is initialized using a standard ImageNet dataset.

In accordance with the present disclosure, the step 308 of classifying the segmented symbols is preceded by training a GCNN to obtain the pre-trained GCNN. The step of training comprises receiving a set of symbol classes comprising a single instance per symbol class in the form of the VG image. A received RG image may be converted to the VG image for training the GCNN. The single instance per symbol class is augmented by applying affine transformation to each sub-part of the received VG image with rotation ranging from an angle −20° to 20°, scaling parameter ranging from 0.9 to 1.1 and shear parameter ranging from −0.05 to 0.05 to obtain an augmented set of instances for each symbol class. Considering symbols have very minute inter-class variations, the standard augmentation techniques do not prove very beneficial since they perform uniform changes in the resulting augment data. This is addressed by applying affine transformations to each subpart instead of the full image, to increase variations in created instances.

A plurality of features is obtained for each point in (i) the received VG image and (ii) the augmented set of instances for each symbol class. In an embodiment, the plurality of features includes: (i) two features corresponding to a coordinate information associated with each point and (ii) seven features corresponding to seven Hu moments for each point. Hu moments are a set of 7 values which are invariant to image transformations like translation, scale, rotation and reflection. Since the points are arranged sequentially, a window of 6 sequential points is used to calculate the seven Hu moments for every point. In accordance with the present disclosure, since the scaling factor is 1, the feature is ignored.

A graph is generated for every instance of a symbol class, using each point in (i) the received VG image and (ii) the augmented set of instances for each symbol class, wherein each point is characterized by the obtained plurality of features. The generated graph is then input to the GCNN for training and obtaining the pre-trained GCNN.

Figure 6:
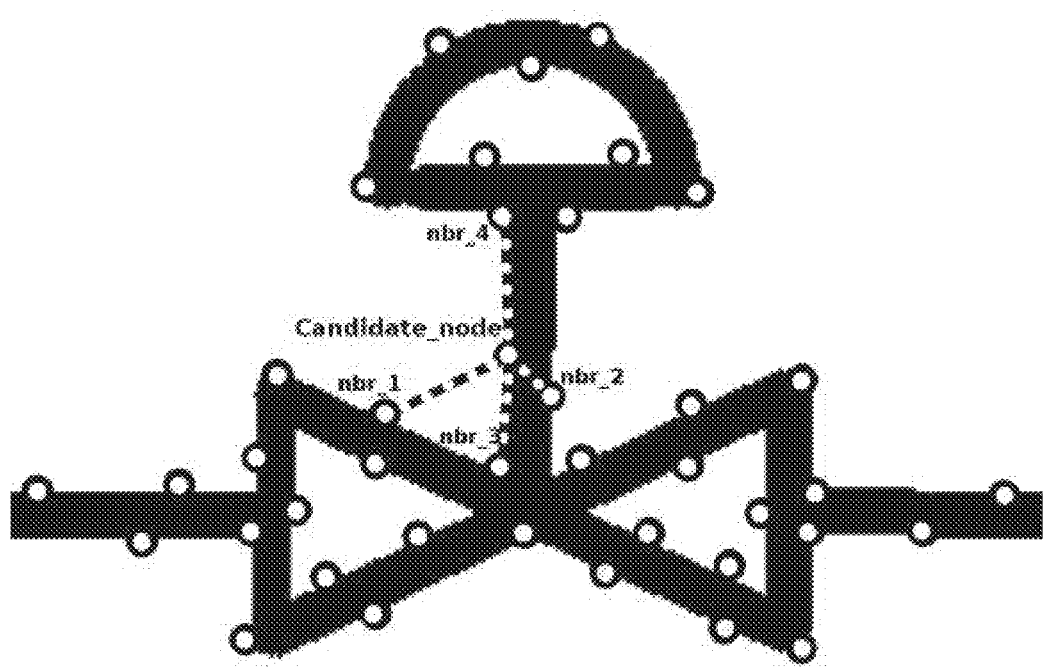
FIG. 6 illustrates structure of a graph generated for a symbol, in accordance with some embodiments of the present disclosure.

FIG. 6 illustrates structure of a graph generated for a symbol, in accordance with some embodiments of the present disclosure. The graph is constructed by creating edges between 4 nearest neighbors of each node, where L2 distance is used as a metric. nbr_i refers to the $i^{th}$ neighbor of a candidate_node illustrated in FIG. 6.

In accordance with the present disclosure, the step 308 of classifying the segmented symbols is preceded by training the CNN using an image created from each point in (i) the received VG image and (ii) the augmented set of instances for each symbol class for obtaining a global embedding (feature maps) of the point cloud thereof.

Experimental Results

DGCNN architecture: In accordance with an embodiment of the present disclosure, the DGCNN architecture used for classification of sampled set of points into one of the symbol classes, takes F (=9) dimensional point cloud with n (=1024) points as input. The network comprises a set of 3 EdgeConv layers whose outputs are aggregated globally to get a global descriptor, which is later used to obtain classification scores for C classes. The embeddings obtained at a final trained global layer are stored and used for comparison at inference.

EdgeConv block: The EdgeConv layer takes input tensor of shape n×$F_1$ and finds k nearest neighbors based upon distance between embeddings. Subsequently, edge features are computed on these k edges by applying multi-layer perceptron on {$a_1$ ... $a_n$} and the output tensor of shape n×k×$a_n$ is max pooled over k neighbors, resulting in a final output tensor of shape n×$a_n$.

DGCNN+ResNet+ArcFace Loss: In accordance with an embodiment of the present disclosure, a pre-trained ResNet-34 is used for extracting visual features from images (224× 224) created from spatial information of point cloud. Subsequently, the ResNet-34 embeddings are aggregated with output of EdgeConv layers of the DGCNN to obtain global descriptors, which are finally utilized to generate the embeddings. These embeddings are trained after introducing arc-margin with respect to their corresponding symbol classes.

Loss function: Cross-entropy loss paired with a softmax layer is the standard architecture used for most real-world classification tasks which works by creating separation between embeddings of different classes. However, in case of symbols which are visually very similar to other classes, this loss causes the network to mis-classify if there occurs even a slight deviation in the test sample embeddings. This is addressed by utilizing Arcface loss which trains the network to generate class embeddings with an additional angular margin between them and increases the discriminating power of the classifier. The Arcface loss for C classes with an additional m margin is represented by $$L_{Arcface} = -\frac{1}{N} \sum_{i=1}^{N} \log \frac{e^{s(\cos(\theta_{y_i}+m))}}{e^{s(\cos(\theta_{y_i}+m))} + \sum_{j=1, j \neq y_i}^{C} e^{s(\cos(\theta_j))}} \rightarrow \quad (3)$$

The loss function differs for each bath of N samples, where $y_i$ is the ground truth for the $i^{th}$ sample in the batch and s is a fixed scalar value.

Figure 7:
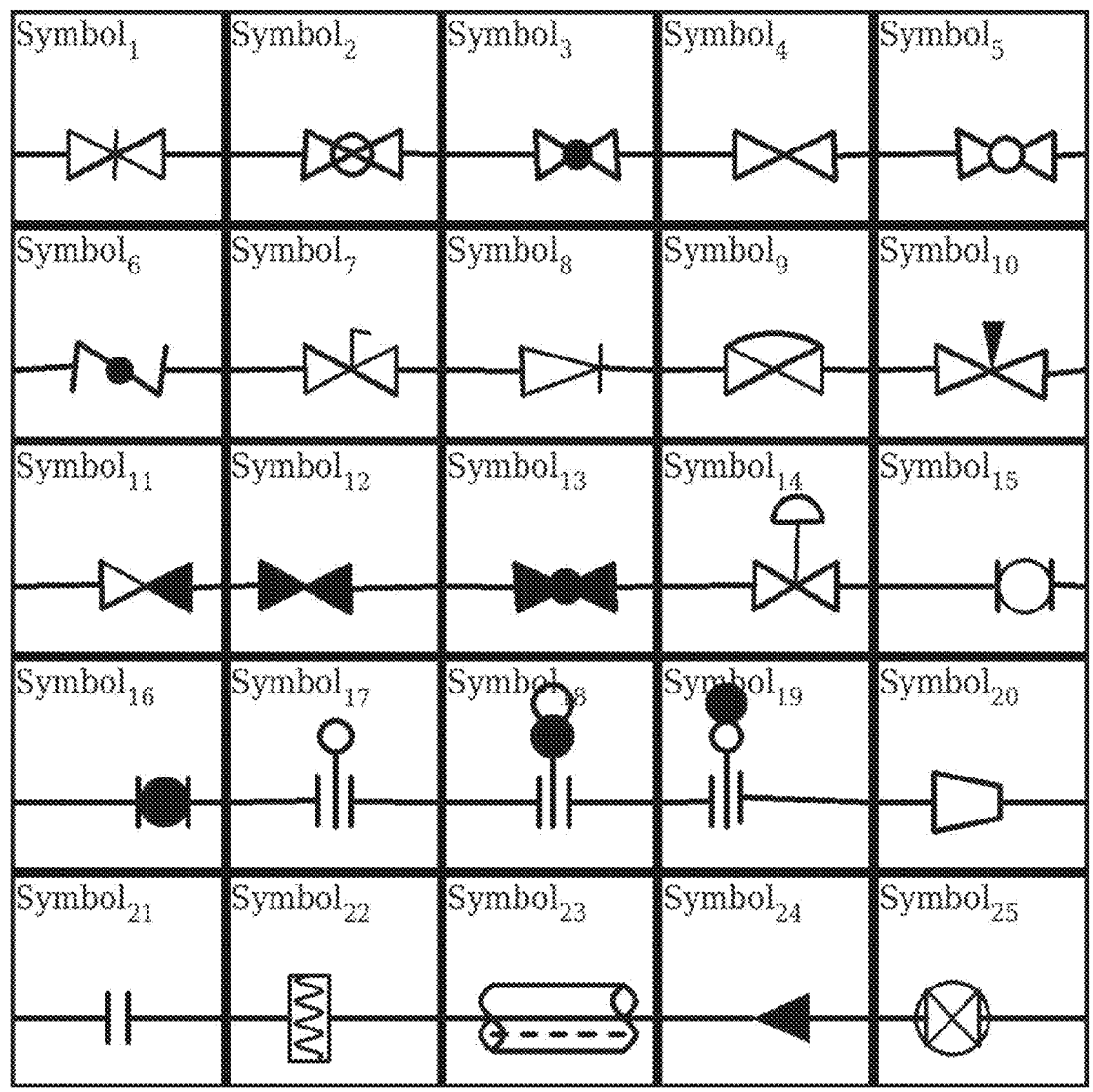
FIG. 7 illustrates a list of symbols ($Symbol_1$-$Symbol_{25}$) used for training and experimental evaluation, in accordance with some embodiments of the present disclosure.

FIG. 7 illustrates a list of symbols ($Symbol_1$-$Symbol_{25}$) used for training and experimental evaluation, in accordance with some embodiments of the present disclosure. The performance of the system and method of the present disclosure was evaluated on a synthetic Dataset—P&ID consisting of 100 P&ID sheets in a test set. These P&ID sheets contain various components (symbols) attached to a network of pipelines. The aim of the experiment is to localize (segment) and classify a set of 25 symbols as shown in FIG. 7. The performance of the system and method of the present disclosure is also compared against the method provided by Rahul et al. in ArXiv 2019 titled "*Automatic information extraction from piping and instrumentation diagrams*" on a private dataset of 12 real P&ID sheets for symbol recognition.

Results of symbol localization is provided in Table I herein below. The emphasis is more on high recall to make sure that no symbol is missed prior to its classification. The results demonstrate that the method and system of the present disclosure performs remarkably well with only a few misses (approx. 0.05%).

TABLE I

Performance of symbol segmentation

| Total Symbols | Correct Symbols localized | False Symbols localized | Missing Symbols |
|---|---|---|---|
| 10630 | 10482 | 43 | 148 |

The performance of the method and system of the present disclosure using a Dynamic Graph Convolutional Neural Network (DGCNN) with and without Arcface loss and ResNet-34 is evaluated.

TABLE II

Comparison of the performance of symbol classification using the DGCNN and its variants having Arcface loss and ResNet-34 embeddings on the synthetic Dataset - P&ID - Part 1

| | DGCNN | | | DGCNN + Arcface | | |
|---|---|---|---|---|---|---|
| Symbols | Precision | Recall | F1-score | Precision | Recall | F1-score |
| $Symbol_1$ | 0.7565 | 0.7005 | 0.7274 | 0.8669 | 0.8096 | 0.8373 |
| $Symbol_2$ | 0.8161 | 0.8512 | 0.8333 | 0.9202 | 0.8975 | 0.9087 |
| $Symbol_3$ | 0.7602 | 0.7238 | 0.7416 | 0.9119 | 0.7937 | 0.8487 |
| $Symbol_4$ | 0.736 | 0.7825 | 0.7585 | 0.8293 | 0.8708 | 0.8495 |
| $Symbol_5$ | 0.8137 | 0.763 | 0.7875 | 0.8809 | 0.9068 | 0.8937 |
| $Symbol_6$ | 0.8316 | 0.7562 | 0.7921 | 0.922 | 0.9292 | 0.9255 |
| $Symbol_7$ | 0.7875 | 0.7478 | 0.7671 | 0.8938 | 0.8539 | 0.8734 |
| $Symbol_8$ | 0.752 | 0.8473 | 0.7968 | 0.7925 | 0.9031 | 0.8442 |
| $Symbol_9$ | 0.6144 | 0.8366 | 0.7084 | 0.6672 | 0.9146 | 0.776 |
| $Symbol_{10}$ | 0.8595 | 0.7355 | 0.7926 | 0.9296 | 0.9003 | 0.9147 |
| $Symbol_{11}$ | 0.6786 | 0.8614 | 0.7591 | 0.7541 | 0.9219 | 0.8296 |
| $Symbol_{12}$ | 0.7609 | 0.61 | 0.6771 | 0.8626 | 0.6691 | 0.7536 |
| $Symbol_{13}$ | 0.8304 | 0.7907 | 0.8101 | 0.9087 | 0.8643 | 0.886 |
| $Symbol_{14}$ | 0.8601 | 0.8175 | 0.8382 | 0.8636 | 0.9076 | 0.885 |
| $Symbol_{15}$ | 0.7614 | 0.7537 | 0.7576 | 0.866 | 0.9139 | 0.8893 |
| $Symbol_{16}$ | 0.7802 | 0.8481 | 0.8128 | 0.9041 | 0.8452 | 0.8736 |
| $Symbol_{17}$ | 0.6363 | 0.7968 | 0.7076 | 0.7176 | 0.8886 | 0.794 |
| $Symbol_{18}$ | 0.8159 | 0.8259 | 0.8209 | 0.867 | 0.9288 | 0.8968 |
| $Symbol_{19}$ | 0.7554 | 0.6301 | 0.6871 | 0.8617 | 0.6818 | 0.7612 |
| $Symbol_{20}$ | 0.7844 | 0.7636 | 0.7739 | 0.8857 | 0.8645 | 0.875 |
| $Symbol_{21}$ | 0.852 | 0.8193 | 0.8353 | 0.9335 | 0.9025 | 0.9177 |
| $Symbol_{22}$ | 0.7872 | 0.8282 | 0.8072 | 0.8981 | 0.8899 | 0.894 |
| $Symbol_{23}$ | 0.7314 | 0.8093 | 0.7684 | 0.8152 | 0.8991 | 0.8552 |
| $Symbol_{24}$ | 0.7196 | 0.7593 | 0.7389 | 0.8535 | 0.8325 | 0.8428 |
| $Symbol_{25}$ | 0.7963 | 0.6293 | 0.703 | 0.914 | 0.6749 | 0.7765 |

TABLE II

Comparison of the performance of symbol classification using the DGCNN and its variants having Arcface loss and ResNet-34 embeddings on the synthetic Dataset - P&ID - Part 2

| | DGCNN + Resnet-34 + Arcface | | |
|---|---|---|---|
| Symbols | Precision | Recall | F1-score |
| $Symbol_1$ | 0.8758 | 0.796 | 0.834 |
| $Symbol_2$ | 0.9005 | 0.892 | 0.8962 |
| $Symbol_3$ | 0.9138 | 0.8043 | 0.8556 |
| $Symbol_4$ | 0.8441 | 0.8475 | 0.8458 |
| $Symbol_5$ | 0.8913 | 0.9022 | 0.8967 |
| $Symbol_6$ | 0.9146 | 0.9146 | 0.9146 |
| $Symbol_7$ | 0.8668 | 0.831 | 0.8485 |
| $Symbol_8$ | 0.7947 | 0.9274 | 0.856 |
| $Symbol_9$ | 0.6714 | 0.8968 | 0.7679 |
| $Symbol_{10}$ | 0.9244 | 0.9178 | 0.9211 |
| $Symbol_{11}$ | 0.7583 | 0.9095 | 0.8271 |
| $Symbol_{12}$ | 0.8692 | 0.6786 | 0.7622 |
| $Symbol_{13}$ | 0.9137 | 0.8412 | 0.876 |
| $Symbol_{14}$ | 0.8687 | 0.906 | 0.8869 |
| $Symbol_{15}$ | 0.8759 | 0.9348 | 0.9044 |
| $Symbol_{16}$ | 0.8771 | 0.8679 | 0.8724 |
| $Symbol_{17}$ | 0.7131 | 0.8904 | 0.7919 |
| $Symbol_{18}$ | 0.8784 | 0.932 | 0.9044 |
| $Symbol_{19}$ | 0.8475 | 0.6858 | 0.7581 |
| $Symbol_{20}$ | 0.8985 | 0.856 | 0.8767 |
| $Symbol_{21}$ | 0.939 | 0.9044 | 0.9214 |
| $Symbol_{22}$ | 0.8702 | 0.9028 | 0.8862 |
| $Symbol_{23}$ | 0.8326 | 0.8938 | 0.8622 |
| $Symbol_{24}$ | 0.8596 | 0.8685 | 0.8641 |
| $Symbol_{25}$ | 0.9161 | 0.6702 | 0.7741 |

It may be noted that the method and system of the present disclosure is able to recognize different symbols using only one prototypical example image per symbol class with excellent precision, recall and F1-score values. The average accuracy of symbol classification computed using DGCNN with categorical cross-entropy loss is 77.07%. However, a significant improvement in accuracy is observed using Arcface loss where the average accuracy of symbol classification obtained is 85.78%. Also, while using DGCNN+ResNet-34+Arcface loss, comparable accuracy of 85.98% with very slight improvement was observed. 1024 points were used for the classification using DGCNN and the number (k) of nearest neighbors for the EdgeConv block is set to 20.

Table III below provides a comparison of the method and system of the present disclosure with a prior art method by Rahul et al. mentioned above, which uses a large number of training images. Results are obtained on a real-world P&ID dataset. The method and system of the present disclosure is referred as One-Shot Symbol Recognition in P&ID (OSSR-PID), whole the method by Rahul et al. is referred as prior art for sake of explanation.

TABLE III

Comparison of the OSSR-PID with the prior art.

| | Precision | | Recall | | F1-Score | |
|---|---|---|---|---|---|---|
| Symbols | Prior art | OSSR-PID | Prior art | OSSR-PID | Prior art | OSSR-PID |
| Bl-V | 0.925 | 0.913 | 0.936 | 0.896 | 0.931 | −.0904 |
| Ck-V | 0.941 | 0.911 | 0.969 | 0.902 | 0.955 | 0.906 |
| Ch-V | 1.000 | 0.99 | 0.893 | 0.902 | 0.944 | 0.944 |
| Cr-V | 1.000 | 1.000 | 0.989 | 0.98 | 0.995 | 0.990 |
| Con | 1.000 | 0.875 | 0.905 | 0.922 | 0.950 | 0.897 |
| F-Con | 0.976 | 0.862 | 0.837 | 0.947 | 0.901 | 0.903 |
| Gt-V-nc | 0.766 | 0.894 | 1.000 | 1.000 | 0.867 | 0.944 |
| Gb-V | 0.888 | 0.871 | 0.941 | 0.884 | 0.914 | 0.877 |
| Ins | 1.000 | 1.000 | 0.985 | 0.982 | 0.992 | 0.990 |
| GB-V-nc | 1.000 | 1.000 | 0.929 | 0.977 | 0.963 | 0.988 |
| Others | 0.955 | 0.927 | 1.000 | 0.941 | 0.970 | 0.934 |

It may be noted that the OSSR-PID performs remarkably well and comparable to the prior art method. However, the OSSR-PID requires a single instance per symbol class for training while providing a comparable performance to the prior art which is fully supervised and needs a large amount of annotated training data for each symbol class.

Summarizing, symbol recognition in P&ID, in accordance with the present disclosure, comprises localization of the symbols followed by their classification. As P&IDs often contain noise in the form of texts, blurred or smudged edges, in order to develop an automatic method for extracting symbols, a machine learning/deep learning model requires large amount of annotated symbols for its training. This annotated set needs to contain a diverse variety of symbols having different sort of noises, orientations in order to handle different cases during inference. In this scenario, a large annotated dataset is necessary because localization is also being performed by the model itself and the network needs to be able to handle different noises and orientations of symbols in P&ID. However, in the method and system of the present disclosure, the dependency on a large training set has been circumvented by use of the path sampling technique by converting an RG image to a VG image which localizes symbols in the P&ID without any variations in the background. In case of training a classifier for these symbols, a single training example per symbol class is sufficient as the network just needs to learn the class-features only.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising the steps of:
   receiving as an input, via one or more hardware processors, at least a portion of a Piping and Instrumentation Diagram (P&ID) as a raster graphics (RG) image;
   converting, via the one or more hardware processors, the raster graphics (RG) image to a vector graphics (VG) image, wherein contours of a plurality of entities comprised in the VG image are represented by sequential Bezier curves, and wherein the plurality of entities includes texts, symbols and pipelines; and
   segmenting, via the one or more hardware processors, the symbols from the VG image, wherein the sequential Bezier curves along the contours of the plurality of entities represent one or more paths comprising one or more loops such that ends thereof are connected, wherein the step of segmenting the symbols comprises:
     sampling a set of points sequentially along the one or more paths at predetermined fixed distance intervals, each point in the sampled set of points being characterized by a slope;
     eliminating the one or more paths corresponding to the texts based on (i) a length associated with the one or more paths computed using the sampled set of points and (ii) a computed segregation threshold, wherein the computed segregation threshold is a knee point of a curve representing the number of sampled points in each of the one or more paths (Y-axis) versus a cardinal value of the one or more paths (X-axis); and
     eliminating the one or more paths corresponding to the pipelines using a sliding window method.

2. The processor implemented method of claim 1, wherein the step of sampling the set of points is preceded by preprocessing of the VG image for at least one of rotation and scaling variations.

3. The processor implemented method of claim 1, wherein the step of eliminating the one or more paths corresponding to the texts comprises:
computing the length associated with the one or more paths for each entity from the plurality of entities based on the number of sampled points in each of the one or more paths, the number of sampled points being proportional to the length of a corresponding path; and
identifying the one or more paths having a computed length lesser than the computed length associated with the knee point as the one or more paths corresponding to the texts for elimination.

4. The processor implemented method of claim 1, wherein the step of eliminating pipelines using a sliding window method comprises:
querying each point $p_i$ from the sampled set of points, for the presence of other points in a sliding window, wherein the sliding window is of length 1 and height t in an orthogonal direction to the slope of the point $p_i$; and
classifying the queried point $p_i$ as a component of the pipelines for elimination, if a standard deviation of points in the sliding window is within a predetermined threshold.

5. The processor implemented method of claim 3, wherein the height t is determined by traversing the one or more paths and finding a maximum distance from the sampled set of points along the orthogonal direction to the queried point.

6. The processor implemented method of claim 4, wherein the slope of the point $p_i$ with reference to two neighboring points and $p_{i-1}$ and $p_{i+1}$ is represented as:

slope$_i$=Avg($a$ tan $2(p_{i-1},p_i)$,$a$ tan $2(p_i,p_{i+1})$,$a$ tan $2(p_{i-1},p_{i+1})$); and the height t is represented as:
t=MAX($\in,\beta$ MAX($\forall p_{iN}$dist($p_i,p_{iN}$))), wherein $p_{iN}$ are points along the paths orthogonal to a query point $p_i$.

7. The processor implemented method of claim 1, further comprising classifying, via the one or more hardware processors, the segmented symbols using (i) a pre-trained Graph Convolutional Neural Network (GCNN), wherein the segmented symbols are represented by an associated point cloud comprising the sampled set of points or (ii) the pre-trained GCNN appended to a Convolutional Neural Network (CNN).

8. The processor implemented method of claim 6, wherein the step of classifying the segmented symbols is preceded by training a GCNN, the step of training comprising:
receiving a set of symbol classes comprising a single instance per symbol class in the form of the VG image;
augmenting the single instance per symbol class by applying affine transformation to each sub-part of the received VG image with rotation ranging from an angle −20° to 20°, scaling parameter ranging from 0.9 to 1.1 and shear parameter ranging from −0.05 to 0.05 to obtain an augmented set of instances for each symbol class;
obtaining a plurality of features for each point in (i) the received VG image and (ii) the augmented set of instances for each symbol class, wherein the plurality of features includes: (i) two features corresponding to a coordinate information associated with each point and (ii) seven features corresponding to seven Hu moments for each point; and
training the GCNN, by inputting a graph generated for every instance of a symbol class, using each point in (i) the received VG image and (ii) the augmented set of instances for each symbol class, each point having the obtained plurality of features, to obtain the pre-trained GCNN.

9. The processor implemented method of claim 7, wherein the step of classifying the segmented symbols is preceded by training the CNN, using an image created from each point in (i) the received VG image and (ii) the augmented set of instances for each symbol class for obtaining a global embedding of the point cloud thereof.

10. A system comprising:
a memory storing instructions;
one or more communication interfaces; and
one or more hardware processors coupled to the memory via the one or more communication interfaces, wherein the one or more hardware processors are configured by the instructions to:
receive as an input, at least a portion of a Piping and Instrumentation Diagram (P&ID) as a raster graphics (RG) image;
convert the raster graphics (RG) image to a vector graphics (VG) image, wherein contours of a plurality of entities comprised in the VG image are represented by sequential Bezier curves, and wherein the plurality of entities includes texts, symbols and pipelines; and
segment the symbols from the VG image, wherein the sequential Bezier curves along the contours of the plurality of entities represent one or more paths comprising one or more loops such that ends thereof are connected, wherein the symbols are segmented by:
sampling a set of points sequentially along the one or more paths at predetermined fixed distance intervals, each point in the sampled set of points being characterized by a slope;
eliminating the one or more paths corresponding to the texts based on (i) a length associated with the one or more paths computed using the sampled set of points and (ii) a computed segregation threshold being a knee point of a curve representing the number of sampled points in each of the one or more paths (Y-axis) versus a cardinal value of the one or more paths (X-axis), wherein the computed segregation threshold is a knee point of a curve representing the number of sampled points in each of the one or more paths (Y-axis) versus a cardinal value of the one or more paths (X-axis); and
eliminating the one or more paths corresponding to the pipelines using a sliding window method.

11. The system of claim 10, wherein the one or more processors are configured by the instructions to preprocess the VG image for at least one of rotation and scaling variations prior to sampling the set of points.

12. The system of claim 10, wherein the one or more processors are configured by the instructions to eliminate the one or more paths corresponding to the texts by:
computing the length associated with the one or more paths for each entity from the plurality of entities based on the number of sampled points in each of the one or more paths, the number of sampled points being proportional to the length of a corresponding path; and identifying the one or more paths having a computed length lesser than the computed length associated with the knee point as the one or more paths corresponding to the texts for elimination.

13. The system of claim 11, wherein the one or more processors are configured by the instructions to eliminate pipelines using a sliding window method comprises:

querying each point $p_i$ from the sampled set of points, for the presence of other points in a sliding window, wherein the sliding window is of length l and height t in an orthogonal direction to the slope of the point p, and wherein the height t is determined by traversing the one or more paths and finding a maximum distance from the sampled set of points along the orthogonal direction to the queried point; and classifying the queried point $p_i$ as a component of the pipelines for elimination, if a standard deviation of points in the sliding window is within a predetermined threshold.

14. The system of claim 12, wherein the slope of the point $p_i$ with reference to two neighboring points and $p_{i-1}$ and $p_{i+1}$ is represented as:

$$slope_i = Avg(a\ tan\ 2(p_{i-1},p), a\ tan\ 2(p,p_{i+1}), a\ tan\ 2(p_{i-1},p_{i+1}));\ and$$

the height t is represented as:
$t = MAX(\in, \beta\ MAX(\forall p_{iN} dist(p_i, p_{iN})))$, wherein $p_{iN}$ are points along the paths orthogonal to a query point $p_i$.

15. The system of claim 10, wherein the one or more processors are further configured by the instructions to classify the segmented symbols using (i) a pre-trained Graph Convolutional Neural Network (GCNN), wherein the segmented symbols are represented by an associated point cloud comprising the sampled set of points or (ii) the pre-trained GCNN appended to a Convolutional Neural Network (CNN).

16. The system of claim 14, wherein the one or more processors are configured by the instructions to train a GCNN, prior to classifying the segmented symbols, by:

receiving a set of symbol classes comprising a b in the form of the VG image;

augmenting the single instance per symbol class by applying affine transformation to each sub-part of the received VG image with rotation ranging from an angle −20° to 20°, scaling parameter ranging from 0.9 to 1.1 and shear parameter ranging from −0.05 to 0.05 to obtain an augmented set of instances for each symbol class;

obtaining a plurality of features for each point in (i) the received VG image and (ii) the augmented set of instances for each symbol class, wherein the plurality of features includes:

(i) two features corresponding to a coordinate information associated with each point and (ii) seven features corresponding to seven Hu moments for each point; and training the GCNN, by inputting a graph generated for every instance of a symbol class, using each point in (i) the received VG image and (ii) the augmented set of instances for each symbol class, each point having the obtained plurality of features, to obtain the pre-trained GCNN, wherein the pre-trained GCNN is a Dynamic Graph CNN (DGCNN) and the CNN is a Residual neural network (ResNet).

17. The system of claim 15, wherein the one or more processors are configured by the instructions to train the CNN, prior to classifying the segmented symbols, using an image created from each point in (i) the received VG image and (ii) the augmented set of instances for each symbol class for obtaining a global embedding of the point cloud thereof.

18. One or more non-transitory machine-readable information storage mediums comprising one or more instructions which when executed by one or more hardware processors cause:

receiving as an input, via one or more hardware processors, at least a portion of a Piping and Instrumentation Diagram (P&ID) as a raster graphics (RG) image;

converting, via the one or more hardware processors, the raster graphics (RG) image to a vector graphics (VG) image, wherein contours of a plurality of entities comprised in the VG image are represented by sequential Bezier curves, and wherein the plurality of entities includes texts, symbols and pipelines; and segmenting, via the one or more hardware processors, the symbols from the VG image, wherein the sequential Bezier curves along the contours of the plurality of entities represent one or more paths comprising one or more loops such that ends thereof are connected, wherein the step of segmenting the symbols comprises:

sampling a set of points sequentially along the one or more paths at predetermined fixed distance intervals, each point in the sampled set of points being characterized by a slope;

eliminating the one or more paths corresponding to the texts based on (i) a length associated with the one or more paths computed using the sampled set of points and (ii) a computed segregation threshold, wherein the computed segregation threshold is a knee point of a curve representing the number of sampled points in each of the one or more paths (Y-axis) versus a cardinal value of the one or more paths (X-axis); and eliminating the one or more paths corresponding to the pipelines using a sliding window method.

19. The one or more non-transitory machine-readable information storage mediums of claim 18, wherein the one or more instructions further cause: classifying, via the one or more hardware processors, the segmented symbols using (i) a pre-trained Graph Convolutional Neural Network (GCNN), wherein the segmented symbols are represented by an associated point cloud comprising the sampled set of points or (ii) the pre-trained GCNN appended to a Convolutional Neural Network (CNN).

* * * * *